US008107712B2

(12) United States Patent
Holl

(10) Patent No.: US 8,107,712 B2
(45) Date of Patent: Jan. 31, 2012

(54) METHOD AND TESTING DEVICE FOR TESTING VALUABLE DOCUMENTS

(75) Inventor: Norbert Holl, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 608 days.

(21) Appl. No.: 10/528,118

(22) PCT Filed: Sep. 15, 2003

(86) PCT No.: PCT/EP03/10237

§ 371 (c)(1),
(2), (4) Date: Feb. 3, 2006

(87) PCT Pub. No.: WO2004/027718

PCT Pub. Date: Apr. 1, 2004

(65) Prior Publication Data

US 2006/0140468 A1 Jun. 29, 2006

(30) Foreign Application Priority Data

Sep. 17, 2002 (DE) ................................. 102 43 051

(51) Int. Cl.
*G06K 9/00* (2006.01)

(52) U.S. Cl. ........................... 382/135; 356/71; 235/371

(58) Field of Classification Search .................. 382/135, 382/322, 137, 140; 250/341.1, 556, 559, 250/562, 563, 571, 572; 235/449, 476; 356/71, 356/394, 430, 435
See application file for complete search history.

(56) References Cited

U.S. PATENT DOCUMENTS

| | | | | | |
|---|---|---|---|---|---|
| 4,159,874 | A * | 7/1979 | Dearth et al. | ................... | 356/73 |
| 4,255,057 | A * | 3/1981 | Williams | ....................... | 356/435 |
| 4,352,988 | A * | 10/1982 | Ishida | ...................... | 250/559.11 |
| 4,587,434 | A * | 5/1986 | Roes et al. | ..................... | 250/556 |
| 4,973,851 | A * | 11/1990 | Lee | ............................... | 250/556 |
| 5,367,577 | A * | 11/1994 | Gotaas | .......................... | 382/135 |
| 5,443,144 | A * | 8/1995 | Dobbins et al. | ............... | 194/317 |
| 5,923,413 | A * | 7/1999 | Laskowski | ...................... | 356/71 |
| 5,931,277 | A * | 8/1999 | Allan et al. | ................... | 194/317 |
| 6,101,266 | A * | 8/2000 | Laskowski et al. | ........... | 382/135 |
| 6,242,733 | B1 * | 6/2001 | Ma et al. | ................... | 250/223 R |
| 6,573,983 | B1 * | 6/2003 | Laskowski | ...................... | 356/71 |

(Continued)

FOREIGN PATENT DOCUMENTS

DE 198 40 482 A1 3/2000

(Continued)

*Primary Examiner* — Jingge Wu

(74) *Attorney, Agent, or Firm* — Rothwell, Figg, Ernst & Manbeck, P.C.

(57) ABSTRACT

A method as well as a respective checking apparatus for checking a document of value (1), with which the document of value (1) at least in a partial area is illuminated with an intensity ($I_B$) and at different measuring places (2) the intensity ($I_T$) of the light transmitted through the partial area of the document of value (1) and the intensity ($I_R$) of the light reflected by the partial area of the document of value (1) is captured. For eliminating the impact of thickness fluctuations within the document of value and an at the same time simple checking it is provided that the intensities ($I_T$, $I_R$) of the transmitted and reflected light are captured separately, that for each of the different measuring places (2) the sum ($I_T$+$I_R$) of the intensities ($I_T$, $I_R$) of the transmitted and reflected light is calculated, and that the sum ($I_T$+$I_R$) is compared to a predetermined standard value ($I_S$).

25 Claims, 2 Drawing Sheets

U.S. PATENT DOCUMENTS

| | | | | |
|---|---|---|---|---|
| 6,636,615 | B1 * | 10/2003 | Rhoads et al. | 382/100 |
| 6,744,050 | B1 * | 6/2004 | Hornung et al. | 250/341.1 |
| 6,774,986 | B2 * | 8/2004 | Laskowski | 356/71 |
| 6,797,974 | B2 * | 9/2004 | Philipp et al. | 250/556 |
| 6,918,482 | B2 * | 7/2005 | Thierauf | 194/207 |
| 6,987,868 | B1 * | 1/2006 | Atarashi et al. | 382/112 |
| 7,242,796 | B2 * | 7/2007 | Matsui et al. | 382/135 |
| 7,246,754 | B2 * | 7/2007 | Siuta et al. | 235/492 |
| 7,349,075 | B2 * | 3/2008 | Fujimoto et al. | 356/71 |
| 7,359,543 | B2 * | 4/2008 | Tsuji et al. | 382/137 |
| 7,391,897 | B2 * | 6/2008 | Jones et al. | 382/135 |
| 7,440,604 | B2 * | 10/2008 | Tsuji et al. | 382/137 |
| 7,571,796 | B2 * | 8/2009 | Stenzel et al. | 194/206 |
| 2003/0043365 | A1 * | 3/2003 | Ross et al. | 356/71 |
| 2003/0169899 | A1 * | 9/2003 | Slepyan et al. | 382/100 |
| 2005/0121287 | A1 * | 6/2005 | Giering et al. | 194/207 |
| 2006/0017957 | A1 * | 1/2006 | Degott et al. | 358/1.14 |
| 2007/0095630 | A1 * | 5/2007 | Mennie et al. | 194/206 |

FOREIGN PATENT DOCUMENTS

| | | | |
|---|---|---|---|
| DE | 100 05 514 | A1 | 8/2001 |
| NL | 9 401 933 | A | 7/1996 |
| WO | WO 01/41079 | A1 | 6/2001 |
| WO | WO 01/54076 | A1 | 7/2001 |
| WO | WO 02/41264 | A1 | 5/2002 |

* cited by examiner

METHOD AND TESTING DEVICE FOR TESTING VALUABLE DOCUMENTS

CROSS-REFERENCE TO RELATED APPLICATION

This application is a National Phase of International Application Serial No. PCT/EP03/10237, filed Sep. 15, 2003.

FIELD OF THE INVENTION

The invention relates to a method for checking documents of value, in particular bank notes, as well as a respective checking device.

DESCRIPTION OF THE BACKGROUND ART

Generic methods and checking devices are used, inter alia, for checking bank notes as to their state in view of fitness for use, in particular with regard to soiling and spots. In this connection from the quantity of light transmitted through a bank note to be checked and/or the light reflected by the bank note the degree of soiling of the bank note to be checked is concluded. Since the reflection and transmission behavior strongly varies with the thickness of the bank note paper, due to variations in the thickness of the bank note, for example, due to batch-related thickness fluctuations and/or in the area of watermarks, spots or other soilings can no longer be sufficiently reliably recognized.

In DE 100 05 514 A1 it is proposed to provide a compensation illumination for compensating thickness fluctuations, with which the document of value to be checked is illuminated in a measuring area from both sides with a constant intensity all over the entire measuring area. Here a detector captures the intensity of the light irradiated from the one side onto the document of value and reflected by the document of value and at the same time the intensity of the light irradiated from the other side onto the document of value and transmitted through the document of value. In a clean document of value the intensity captured by the detector remains constant even if the thickness of the document of value changes in the course of the measuring area. Deviations in the captured intensity from a predetermined standard value, however, indicate changes, in particular spots and soilings, in the bank note.

One problem with this method, however, is that a uniform illumination all over the entire measuring area from both sides of the document of value is required, i.e. the illumination profile of the two light sources has to be identical on both sides, so as to achieve an ideal compensation. Otherwise, an overcompensation or undercompensation leads to the fact that thickness fluctuations are not completely compensated and can affect the measuring result. As experience has shown, process tolerances in the illumination principles usual up until now lead to deviations of approximately +/−15% in the intensity of the illumination profile. A wrong compensation of the illumination by 15% with a typical nominal thickness of the document of value of 80 μm can lead to deviations of 3% from the standard value with regard to the captured intensity. Deviations of such a dimension, however, are too high for a reliable recognition of soilings and spots.

SUMMARY OF THE INVENTION

It is therefore the problem of the present invention to create an alternative to the prior art, which enables a reliable checking of documents of value without great technical effort and in a cost-effective fashion independently of thickness fluctuations within the document of value.

This problem is solved by the method and the checking device disclosed herein. Also disclosed are specified advantageous embodiments and developments of the invention.

The inventive method is characterized by the fact that the intensities of the transmitted and reflected light are captured separately, that for the different measuring places the respective sum of the intensities of the transmitted and reflected light is calculated, and that this sum is compared to a predetermined standard value.

The inventive checking device further develops the prior art apparatuses in such a way that the illumination system and the detector system are designed to separately capture the intensity of the transmitted light and the reflected light, and that an evaluation unit for the summation of the intensities of the transmitted light and the reflected light for the different measuring places and for comparing the sum to a predetermined standard value is provided.

The captured reflected light in particular is diffusely reflected, i.e. remitted, light.

The invention is based on the idea to form the illumination system and the detector system in such a way that on the one hand the intensity of the transmitted light and on the other hand the intensity of the reflected light can be captured separately. The intensities of the transmitted light and the reflected light for each individual measuring place are summed up in an evaluation unit, so that for each measuring place precisely one sum intensity value is obtained. The individual sum intensity values then each are compared to a predetermined standard value, so as to conclude the presence of soilings from any deviations.

In a preferred development of the invention it is provided that the intensity values captured from the different measuring places are corrected before the summation for compensating locally differing measuring conditions. A respective correction unit as well as an addition unit designed for the addition of the corrected intensity values can be realized in the form of hardware. But there also is the possibility to realize these units in the form of software on a microprocessor or the like, which for example serves for controlling the checking device. Likewise realizations in the form of software on a conventional computer are also possible, to which raw data of the detector system are transmitted for correction.

When correcting in particular the local intensity fluctuations in illumination given when measuring are taken into consideration. The fluctuations in measuring values caused by fluctuations in the illumination profile can be strongly reduced, which further increases the reliability of the method. A particular effort when constructing the illumination system is not required.

With this method at the same time a correction for the purpose of compensating locally differing detector specifications can be effected, such as for example different sensitivities of the individual detector elements and different dark currents.

As to carry out these corrections, preferably, from each measured intensity value before the summation a dark current measuring value determined for the respective measuring place is deducted. In addition, each intensity value additionally is multiplied with a correction factor determined for the respective measuring place. The checking device for this purpose preferably has a storage device, in which are deposited dark current measuring values and correction factors specific for the different measuring places. Such data are determined e.g. when assembling or putting into operation the checking device or, optionally, later in specific calibration measurings and then are deposited in a non-volatile storage.

The dark current measuring values here are determined by intensity measurings carried out with switched-off illumination. These dark currents are deviations from zero in the individual detector elements of the detector system. Therefore it is sufficient, when for each individual detector element one such dark current value is measured, which then is valid for all measuring places, which were measured with this detector element.

The correction factors on the one hand serve for compensating the different illumination intensities and on the other hand for compensating the sensitivities of the individual detector elements, with which the measurings are carried out at the individual measuring places. For this purpose different place-dependent correction factors are needed for the measuring of the transmission and the measuring of the reflection. Since each detector element monitors precisely one point within the illumination profile, here it is also sufficient, when for each detector element one correction factor for the transmission and one for the reflection is determined and these correction factors then are used for all measuring places measured with this detector element. The correction factors are obtained on the basis of the intensity values, which are measured under ideal conditions by means of calibration measurings in standard trial documents, for example homogenous white foils.

If the documents of value to be checked beside the light scatter also show a light absorption, before an addition the already corrected transmission intensities can be weighted with a weighting factor, which takes into consideration the absorption.

A checking device working particularly effective, which is able to check documents of value all over and with a high throughput, has a transportation device, in which the documents of value for the purpose of measuring are guided in a transportation direction past the illumination system and a detector system adequately positioned to this.

The illumination system here produces an illumination profile which extends transverse to the transportation direction. This can be achieved with an illumination device consisting of one light emitting diode line or by means of a field with several light emitting diode lines extending at right angles to the transportation direction.

The detector system accordingly preferably has one or more detector devices, which comprise a plurality of detector elements, which are positioned in a row and appropriate to the illumination profile at right angles to the transportation direction. This can be e.g. a photodiode line or a plurality of photodiode lines disposed one behind the other.

The invention in a simple and cost-effective fashion permits a reliable check of bank notes and other documents of value as to signs of use. A further advantage of this method is the fact that the separately measured reflection and transmission intensities can be evaluated so as to derive statements concerning further properties of the documents of value. For example, the measured reflection intensities can be used for authenticity tests. The transmission intensity values can be used for recognizing holes and tears.

BRIEF DESCRIPTION OF THE DRAWINGS

In the following the invention is explained with reference to the figures with the help of embodiments.

DETAILED DESCRIPTION OF THE INVENTION

Figure 1:
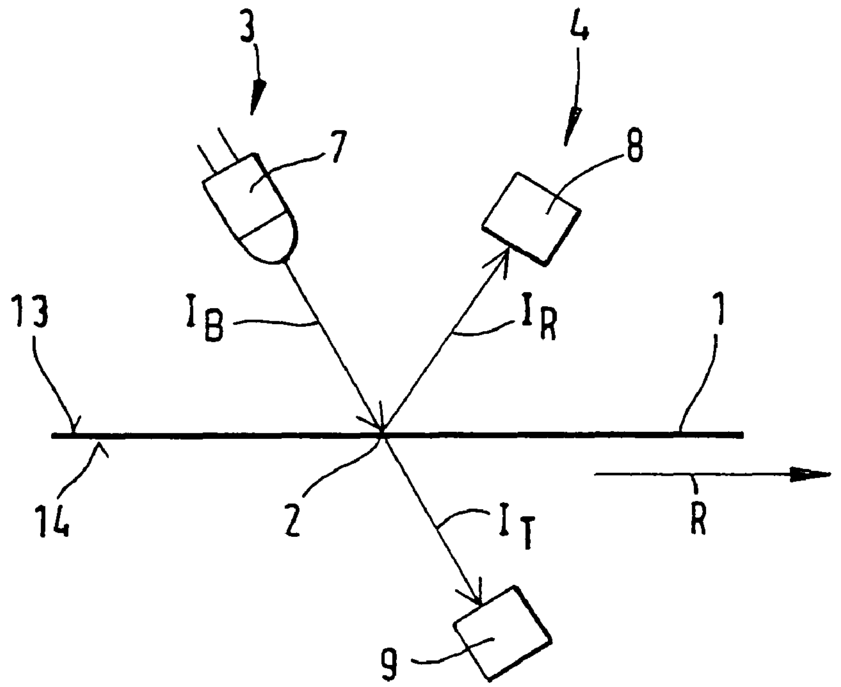
FIG. 1 shows a schematic representation of the arrangement of an illumination system and a detector system for a checking device according to a first embodiment.

With the first embodiment of an inventive checking device as shown in FIG. 1 the illumination system consists of only one illumination device, which illuminates the document of value, here a bank note 1, from a side 13 in an area around a certain measuring place 2. Here the bank notes 1 for the purpose of measuring are drawn past the illumination device 7 in a transportation direction R.

The illumination device 7 is a light emitting diode line, which extends at right angles to the transportation direction R across the entire width of the bank note 1 and which thus produces a broad illumination profile extending at right angles to the transportation direction R. The light here is radiated obliquely in transportation direction R onto the bank note 1 and focused as homogeneously as possible all over the entire illumination profile to a narrow area around the measuring point 2. This can be achieved, for example, with the aid of suitable in particular cylindrical lenses. Instead of one single light emitting diode line the illumination device 7 can also have a plurality of light emitting diode lines disposed in parallel side-by-side, i.e. a whole field of light emitting diodes.

In a short distance behind the illumination system 3 in transportation direction R is located a detector system 4. This detector system 4 here consists of two detector devices 8 and 9. The first detector device 8 is disposed on the same side of the bank note 1 as the illumination device 7 and captures the intensity $I_R$ of the reflected, in particular diffusely reflected, light portion. The second detector device 9 is located directly in the radiation direction of the light radiated by the illumination device 7 on the opposite side 14 of the bank note 1. This detector device 9 captures the intensity $I_T$ of the light portion transmitted through the bank note 1.

The two detector devices 8 and 9 each have a plurality of detector elements, which are disposed side-by-side in a row at right angles to the transportation direction. For example, it can be a photodiode line. Alternatively, a plurality of such rows of detector elements can be disposed side-by-side in parallel, i.e. it can be a whole field of detector elements.

By using a detector element line disposed at right angles to the transportation direction R, the measuring is effected along a plurality of measuring tracks which extend in parallel side-by-side in transportation direction R.

During the transportation of the bank note 1 in transportation direction R in regular cycles the detector device 8 measures the intensity, so that ultimately, after the bank note being transported through the checking device, an all-over "transmission image" and an all-over "reflection image" of the bank note 1 are obtained.

The distance of the individual detector elements determines the local resolution in the direction of the bank note width extending at right angles to the transportation direction R. Usually, such a detector device can have between 200 and 600 sensor elements in one line, so that accordingly between 200 and 600 measuring tracks side-by-side are measured on a bank note 1. The resolution in transportation direction R, however, is given by means of the transportation speed and the measuring rate. Typically, the spatial resolution in transportation direction R lies between 0.1 and 1 millimeter, whereas, as experience has shown, with a spatial resolution of 7⁄16 millimeter=0.4375 millimeter a good recognition of small spots with an at the same time sufficient elimination of the affect the bank note cloudiness has is achieved.

The intensities $I_R$ (x) and $I_T$ (x) captured by the two detector devices 8 and 9 along the measuring tracks, i.e. for each individual measuring place along a measuring track, are processed as follows; here x is the position of a pixel, i.e. the coordinate in transportation direction R:

At first a correction ("Flat Field Correction") of the measured intensities $I_R$ (x) and $I_T$ (x) is effected according to the formula $$I_{RK}(x)=a(x)\cdot(I_R(x)-I_{RD}(x)) \tag{1}$$

and $$I_{TK}(x)=b(x)\cdot(I_T(x)-I_{TD}(x)) \tag{2}$$

Here $I_{RK}$ (x) and $I_{TK}$ (x) are the corrected intensity values. The values a(x) and b(x) are place-dependent correction factors for the reflection or the transmission as to compensating fluctuations in the illumination profile produced by the illumination device 7 as well as for compensating the sensitivities of the individual detector elements at the different places x. The values $I_{RD}$ (x) and $I_{TD}$ (x) are dark current intensities. They are measured intensity portions, which are caused by dark currents of the respective detector elements at the individual places x. The dark current intensities at first are deducted from the measured intensities $I_R$ (x) and $I_T$ (x) according to the formulas (1) and (2), then a correction with the help of the correction factors is effected.

The determination of the dark current intensities and correction factors is effected in separate calibration measurings when manufacturing the checking device and/or at later points of time. Here at first the intensities $I_{RD}$ (x) and $I_{TD}$ (x) caused by the dark currents are determined by a measuring with switched-off light source at the individual places x. Then measurings with a standard sample, for example a homogeneous white foil, are carried out for determining the correction factors. For this purpose the intensity $I_{RS}$ (x) of the reflected portion of light and the intensity $I_{TS}$ (x) of the transmitted portion of light are measured with switched-on light source, i.e. precisely as in the measuring operation. Then the correction factors a(x) and b(x) are calculated according to the formulas $$a(x)=\frac{1}{(I_{RS}(x)-I_{RD}(x))} \tag{3}$$

and $$b(x)=\frac{1}{(I_{TS}(x)-I_{TD}(x))}. \tag{4}$$

After the correction to each position x the corrected intensity values are added $$I_{RK}(x)+I_{TK}(x)=I_S(x), \tag{5}$$

$I_S$(x) being the sum intensity value. The sum intensity value $I_S$ (x) of a clean bank note at all positions x is equal to 1 (when standardized respectively) or is equal to a different constant standard value. With soiled bank notes this value in the areas of the soiling deviates from the standard value.

If the bank note to be checked beside the light scatter also shows light absorption, as, for example, this can be the case with different production batches of bank notes, an addition weighted with a weighting factor c(x) according to the formula $$I_{RK}(x)+c(x)\cdot I_{TK}(x)=I_S(x) \tag{6}$$

is effected.

Figure 2:
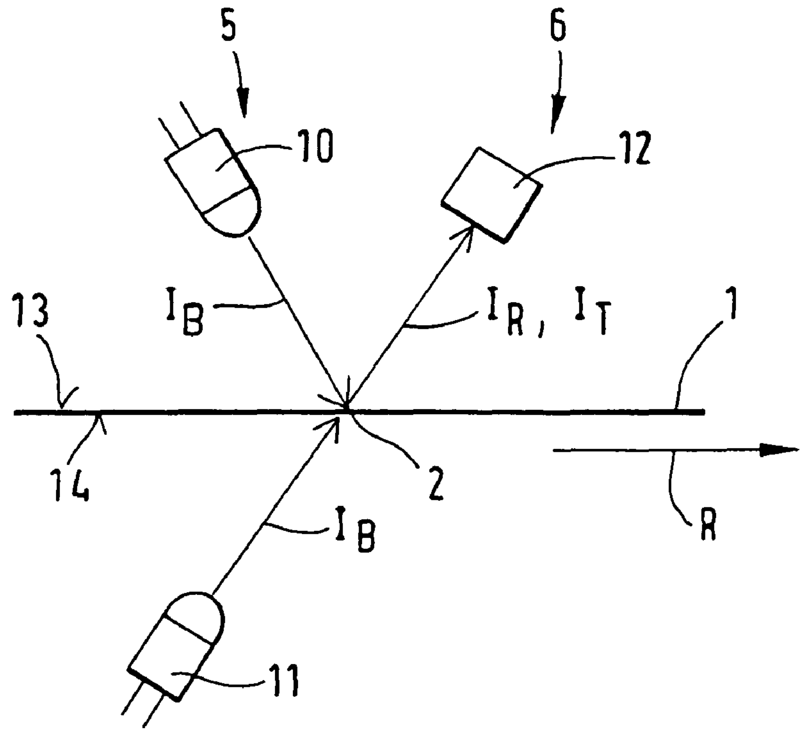
FIG. 2 shows a schematic representation of the arrangement of an illumination system and a detector system for a checking device according to a second embodiment.

FIG. 2 shows a second embodiment of an inventive checking device. Here the illumination system 5 has two illumination devices 10 and 11. The illumination device 10 here has the same structure as the illumination device 7 in the first embodiment and is aligned accordingly. The illumination device 11 disposed on the other side 14 of the bank note 1 has the same structure as the first illumination device 10. In contrast to the embodiment according to FIG. 1, here, however, the same area of the bank note 1 is alternately illuminated around the measuring place 2 by the first illumination device 10 and by the second illumination device 11, which is realized via a respective activation of the two illumination devices 10 and 11.

The detector system 6 has only one detector device 12, which is identically structured and positioned as the first detector device 8 in the embodiment according to FIG. 1. This detector device 12 now accordingly alternately measures the light radiated by the first illumination device 10 onto the bank note 1 and reflected by the bank note 1, and the light radiated by the second illumination device 11 on the opposite side 14 onto the bank note 1 and transmitted by the bank note 1. The illumination cycle here relative to the measuring cycle is preferably selected such rapid that at each measuring place along a measuring track both an intensity signal $I_R$ for the reflection and an intensity signal $I_T$ for the transmission is measured. I.e. again for each individual bank note 1 all-over images of the intensity values $I_R$ and $I_T$ with respect to reflection and transmission are available. The processing of these data is effected precisely in the same way as with the first mentioned embodiment.

Preferably, for the recognition of soil mainly certain areas in the white field, i.e. in the unprinted areas, of the bank note 1 are selected, so as to determine the degree of soiling with the help of the intensity values measured there. Typical extents of such areas lie between 10 and 40 millimeter. But frequently just in these areas of the bank notes are located watermarks and therefore high thickness fluctuations occur.

Figure 3:
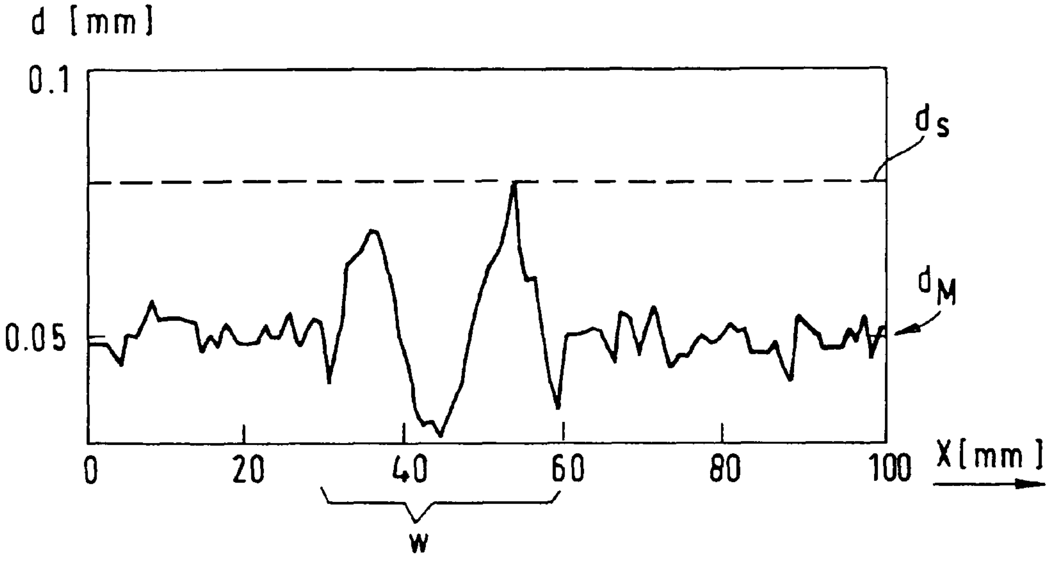
FIG. 3 shows an example for the thickness pattern in the area of a watermark of a bank note.

This is illustrated with the help of FIG. 3, which shows the thickness pattern on a bank note. Here the thickness d above the place x on the bank note 1 along the transportation direction R is plotted. The paper of the bank note has a nominal thickness $d_S$ of 80 μm, which is shown by the dashed line. In fact the average thickness $d_M$ of the bank note amounts to approximately 50 μm. Merely in the area w of a bar watermark there exist extremely high thickness fluctuations, wherein in some areas the thickness d nearly reaches the nominal thickness $d_S$ of 80 μm.

With the inventive measuring method the impacts of such thickness fluctuations on the measuring results are nearly completely eliminated, so that it readily permits to measure the degree of soiling of bank notes even in these white fields having these watermarks.

Figure 4:
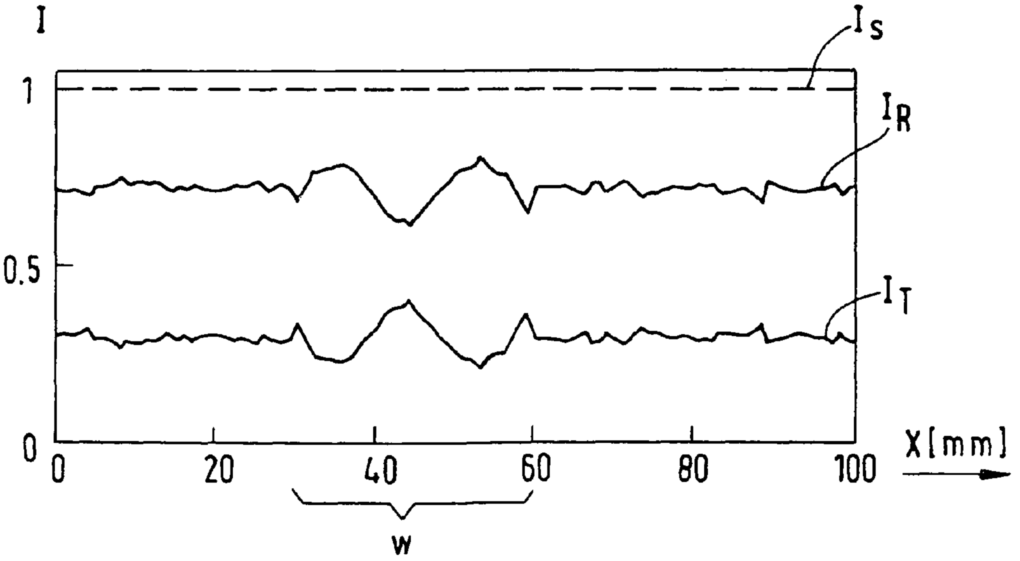
FIG. 4 shows a typical reflection and transmission intensities pattern along a measuring track with a not soiled bank note without absorption.

FIG. 4 shows the captured intensities $I_T$ and $I_R$ for the transmitted or reflected portion of light above the place x on the bank note 1 with bar watermark as described in connection with FIG. 3. The intensities $I_R$ and $I_T$ are plotted in the form of portions in the total radiation standardized to the value 1. Accordingly, the total intensity value $I_S$, consisting of the sum of transmitted and reflected intensity, precisely amounts to 1. This is shown in FIG. 4 by the dashed straight line. As it can be clearly recognized, the sum $I_S$ in particular in the area w of the bar watermark equals to 1, which can be put down to a very good compensation of the impact the thickness variations cause. As already explained in more detail above, a particularly good compensation can be achieved by respective corrections of the captured intensity values $I_R$ or $I_T$, in particular with the help of dark current measuring values and/or correction factors.

In the case of a soiling by spots etc. the sum signal in the area of the soiling is a value deviating from 1, mostly a lower value, so that such soiling can be recognized by simply comparing the sum signal to the standard value to be expected.

The invention claimed is:

1. A method for checking a document of value for soiling and spots, comprising steps of:

illuminating, with an illumination system, the document of value with an intensity ($I_B$) in at least a partial area, wherein the partial area is in an unprinted area of the document of value;

capturing, with a detector system, at a plurality of measuring places, the intensity ($I_T$) of the light transmitted through the partial area of the document of value and the intensity ($I_R$) of the light reflected, or remitted, by the partial area of the document of value; and for each measuring place, summing the intensities of the transmitted and the reflected light to obtain a sum intensity value, wherein the sum intensity value is not impacted by thickness variations of the document of value.

2. The method according to claim 1, wherein the intensity values ($I_T$, $I_R$) captured from the measuring places are corrected before the summation for compensating locally differing measuring conditions.

3. The method according to claim 2, wherein the correction compensates for local intensity fluctuations in illumination that occur during measuring.

4. The method according to claim 2, wherein the correction compensates for locally differing detector specifications.

5. The method according to claim 4, wherein each captured intensity value ($I_T$, $I_R$) is reduced by a dark current measuring value ($I_{TD}$, $I_{RD}$) determined for the respective measuring place before the summation.

6. The method according to claim 5, wherein determining the dark current measuring values (ITD, IRD) intensity measurements is effected with switched-off illumination.

7. The method according to claim 1, wherein each captured intensity value (IT, IR), is multiplied with a correction factor (a, b) determined for the measuring place of the respective intensity value (IT, IR).

8. The method according to claim 7, wherein the correction factors (a, b) are obtained on the basis of the intensity values, which are determined by means of intensity measurements in reference documents.

9. The method according to claim 1, wherein the document of value in a transportation direction is guided past an illumination system and a detector system positioned for this, and with the illumination system at least on one side of the document of value an illumination profile is produced, which extends transverse to the transportation direction.

10. The method according to claim 9, further comprising a plurality of detector elements positioned in a row at right angles to the transportation direction, configured to capture the intensity values ($I_T$, $I_R$) along a plurality of measuring tracks extending in parallel to the transportation direction.

11. The method according to claim 1, wherein the document of value is illuminated from one side and that with a first detector device positioned in the area of the same side of the document of value the intensity ($I_R$) of the reflected portion of light and with a second detector device positioned in the area of the opposite side of the document of value the intensity ($I_T$) of the transmitted portion of light is captured.

12. The method according to claim 1, wherein the document of value alternately is illuminated from a first and from an opposite second side, and with a detector device positioned in the area of the first side of the document of value correspondingly alternately are captured the intensity ($I_T$) of the light transmitted through from the second side of the document of value and the intensity ($I_R$) of the reflected portion of the light incident from the first side on the document of value.

13. A checking device for checking documents of value for soiling and spots, the checking device comprising:

an illumination system, configured to illuminate a document of value at least in a partial area with an intensity (IB), wherein the partial area is in an unprinted area of the document of value;

a detector system, configured to capture from a plurality of measuring places the light transmitted through the document of value and the light reflected, or remitted, by the document of value; and an evaluation unit;

wherein the illumination system and the detector system are designed to separately capture the intensity ($I_T$, $I_R$) of the transmitted light and of the reflected light, and the evaluation unit is configured to sum the intensities of the transmitted and reflected light for each measuring place, so that for each measuring place precisely one sum intensity value is obtained, wherein the sum intensity value is not impacted by thickness variations of the document of value each obtained sum intensity value.

14. The checking device according to claim 13, wherein the evaluation unit comprises a correction unit for correcting the captured intensity values ($I_T$, $I_R$) of the transmitted light and of the reflected light for the measuring places for the purpose of compensating locally differing measuring conditions, as well as an addition unit for adding the corrected intensity values for the measuring places.

15. The checking device according to claim 14, wherein the correction unit compensates for local intensity fluctuations in the illumination produced by the illumination system during measuring.

16. The checking device according to claim 14, wherein the correction unit compensates for locally differing specifications of the detector system.

17. The checking device according to claim 13, further comprising a storage device with dark current measuring values (ITD, IRD) stored for different measuring places, which correspond to transmission or reflection intensity values captured with switched-off illumination, or with correction factors (a, b), stored for different measuring places, for the transmission or reflection intensity values determined by a measurement.

18. The checking device according to claim 13, further comprising a transportation device that guides the document of value for the purpose of a measurement in a transportation direction (R) past the illumination system and the detector system positioned for this.

19. The checking device according to claim 18, wherein the illumination system produces an illumination profile extending transverse to the transportation direction (R).

20. The checking device according to claim 19, wherein the detector system has a detector device, which comprises a plurality of detector elements positioned in a row at right angles to the transportation direction (R).

21. The checking device according to claim 13, wherein the illumination system has an illumination device, which illuminates the document of value from a first side, and that the detector system has a first detector device, which is allocated to the illumination device, is positioned at the same side of the document of value and captures the intensity (IR) of the reflected portion of light, and a second detector device, which is allocated to the illumination device, is positioned at the opposite side of the document of value and captures the intensity (IT) of the transmitted portion of light.

22. The checking device according to claim 13, wherein the illumination system has a first illumination device, which is configured to illuminate the document of value at least in a partial area from a first side, a second illumination device, which is configured to illuminate the document of value in the partial area from a second side, and a control device, which is configured to activate the illumination device in such a way that alternately the first or the second illumination device illuminates the document of value, wherein the detector system has a detector device disposed on the first side and allocated to the two illumination devices, configured to alternately capture the intensity ($I_T$) of the light transmitted through from the second side of the document of value and the intensity ($I_R$) of the reflected portion of the light incident from the first side on the document of value.

23. The method of claim 7, wherein each said captured intensity value is reduced by a dark current measuring value.

24. The method of claim 1, further comprising comparing the sum intensity value for each measuring place to a predetermined standard value.

25. The checking device of claim 13, wherein the evaluation unit is configured to compare each obtained sum intensity value to a predetermined standard value.

* * * * *